United States Patent
Crawford, Jr.

(10) Patent No.: US 10,282,486 B2
(45) Date of Patent: May 7, 2019

(54) METHODS AND APPARATUSES FOR SEARCHING DATA STORED IN A MEMORY ARRAY USING A REPLICATED DATA PATTERN

(71) Applicant: Micron Technology, Inc., Boise, ID (US)

(72) Inventor: Isom Lawrence Crawford, Jr., Royse City, TX (US)

(73) Assignee: Micron Technology, Inc., Boise, ID (US)

(*) Notice: Subject to any disclaimer, the term of this patent is extended or adjusted under 35 U.S.C. 154(b) by 553 days.

(21) Appl. No.: 14/847,822

(22) Filed: Sep. 8, 2015

(65) Prior Publication Data
US 2017/0068717 A1   Mar. 9, 2017

(51) Int. Cl.
G06F 17/30   (2006.01)

(52) U.S. Cl.
CPC .............. G06F 17/30985 (2013.01)

(58) Field of Classification Search
CPC ..... G06F 3/005; G06F 17/16; G06F 17/30985
See application file for complete search history.

(56) References Cited

U.S. PATENT DOCUMENTS

| | | | |
|---|---|---|---|
| 5,678,021 A | 10/1997 | Pawate et al. | |
| 5,751,987 A | 5/1998 | Mahant-Shetti et al. | |
| 6,301,164 B1 | 10/2001 | Manning et al. | |
| 6,466,499 B1 | 10/2002 | Blodgett | |
| 6,950,898 B2 | 9/2005 | Merritt et al. | |
| 7,260,672 B2 | 8/2007 | Garney | |
| 7,546,438 B2 | 6/2009 | Chung | |
| 8,042,082 B2 | 10/2011 | Solomon | |
| 8,279,683 B2 | 10/2012 | Klein | |
| 2001/0010057 A1 | 7/2001 | Yamada | |
| 2003/0222879 A1 | 12/2003 | Lin et al. | |
| 2004/0059725 A1* | 3/2004 | Sharangpani | ..... G06F 17/30985 |
| 2011/0093662 A1 | 4/2011 | Walker et al. | |
| 2011/0119467 A1 | 5/2011 | Cadambi et al. | |
| 2013/0003467 A1 | 1/2013 | Klein | |
| 2014/0250279 A1 | 9/2014 | Manning | |
| 2015/0095095 A1* | 4/2015 | Sorensen | ........... G06Q 10/0631 705/7.26 |
| 2015/0357047 A1* | 12/2015 | Tiwari | ................ G06F 9/30029 714/719 |

OTHER PUBLICATIONS

U.S. Appl. No. 13/449,082, filed Apr. 17, 2012.
U.S. Appl. No. 13/743,686, filed Jan. 17, 2013.
(Continued)

*Primary Examiner* — Mariela Reyes
*Assistant Examiner* — Courtney Harmon
(74) *Attorney, Agent, or Firm* — Fletcher Yoder, P.C.

(57) ABSTRACT

A method includes replicating a data pattern to be searched for, storing the replicated data pattern into a first row of memory cells, and comparing the replicated data pattern to data stored into a second row of memory cells. In response to detecting the data pattern in the data stored into the second row of memory cells, storing into a third row a value indicative of at least one of an occurrence of the data pattern or a position of the searched for data pattern in the data stored into the row of memory cells.

20 Claims, 7 Drawing Sheets

(56) References Cited

OTHER PUBLICATIONS

U.S. Appl. No. 13/774,553, filed Feb. 22, 2013.
Dybdahl, et al., #Destructive-Read in Embedded DRAM, Impact on Power Consumption, Apr. 2006, (10 pgs.), vol. 2, Issue 2, Journal of Embedded Computing-Issues in embedded single-chip multicore achitectures.
Kogge, et al, "Processing in Memory: Chips to Petaflops," May 23, 1997, (8pgs.), retrieved from: http://www.cs.ucf.edu/courses/cda5106/summer02/papers/kogge97PIM.pdf.
Draper, et al., "The Architecture of the DIVA Processing-in-Memory Chip," Jun. 22-26, 2002, (12 pgs.), ICS 02, retrieved from: http://www.isi.edu/-draper/papers/ics2.pdf.
Adibi, et al., "Processing-In-Memory Technology for Knowledge Discovery Algorithms," Jun. 25, 2006, (10pgs.), Proceeding of the Second International Workshop on Data Management on New Hardware, retrieved from: http://www.cs.cmu.edu/-damon2006/pdf/adibi06inmemory.pdf.

\* cited by examiner

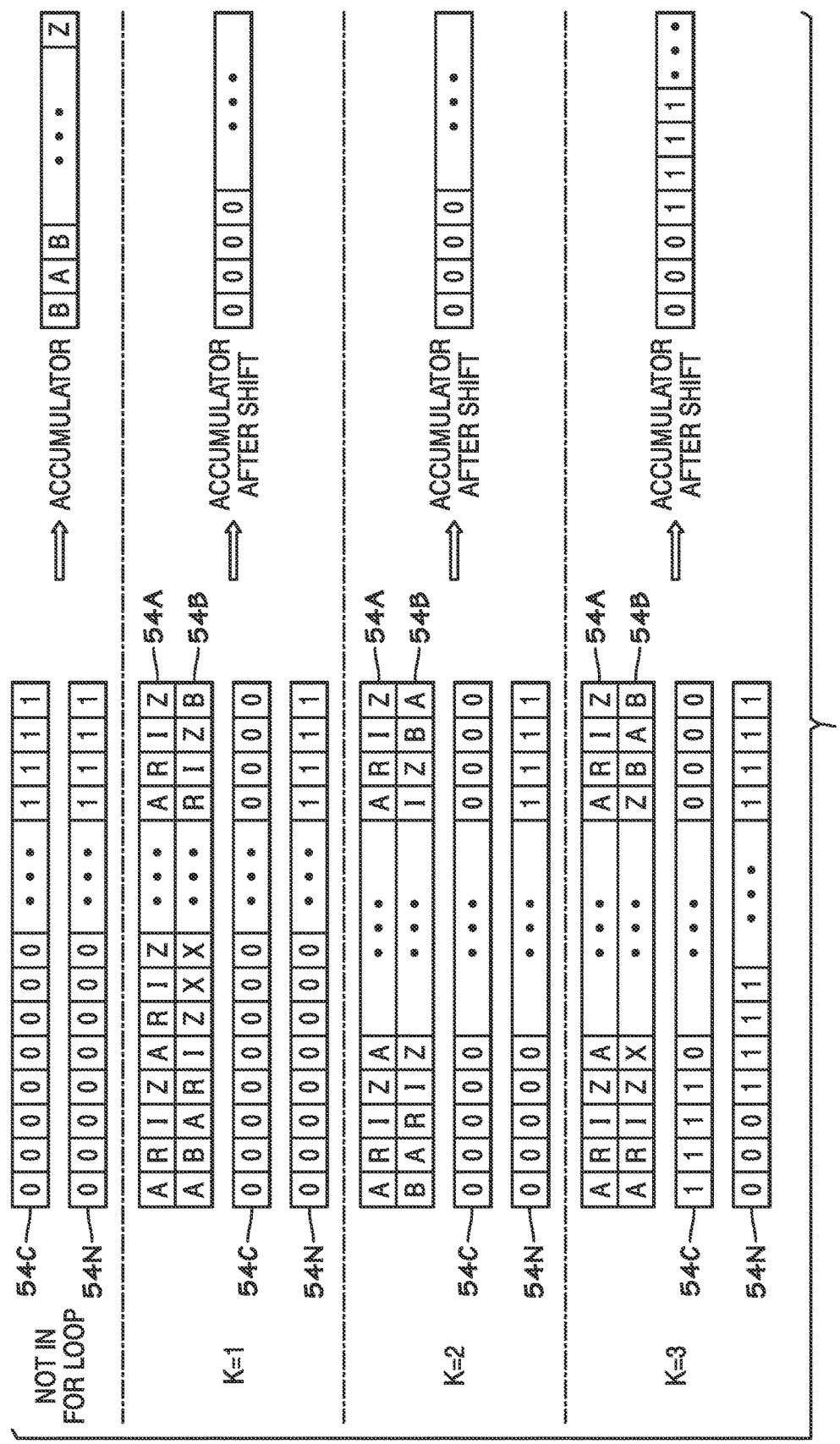

METHODS AND APPARATUSES FOR SEARCHING DATA STORED IN A MEMORY ARRAY USING A REPLICATED DATA PATTERN

BACKGROUND

Field of Invention

Embodiments of the invention relate generally to memory devices, and more specifically, to searching data using processor-in-memory (PIM) devices.

Description of Related Art

Integrated circuit designers often desire to increase the level of integration or density of elements within an integrated circuit by reducing the size of the individual elements and by reducing the separation distance between neighboring elements. In addition, integrated circuit designers often desire to design architectures that may be not only compact, but offer performance advantages, as well as simplified designs. One example of a common integrated circuit element may be a transistor, which may be found in many devices, such as memory circuits, processors, and the like. A typical integrated circuit transistor may include a source, a drain, and a gate formed at the surface of the substrate.

A relatively common integrated circuit device may be a memory device. There may be many different types of memory devices including, for example, volatile and non-volatile memory. Volatile memory devices may include random access memory (RAM), dynamic random access memory (DRAM), static random access memory (SRAM), synchronous dynamic random access memory (SDRAM), and thyristor random access memory (TRAM), and similar volatile memory devices. On the other hand, non-volatile memory devices include NAND flash memory, NOR flash memory, as well as resistance and magnetic based memory devices such as phase change random access memory (PCRAM), resistive random access memory (RRAM), magnetoresistive random access memory (MRAM), spin torque transfer random access memory (STT RAM), and other similar nonvolatile memory devices.

Electronic systems often include a number of processing resources (e.g., one or more processors), which may retrieve and execute instructions and store the results of the executed instructions to a suitable location. A processor may include a number of functional units and similar circuitry to execute instructions by performing a number of operations. In many instances, these processing resources (e.g., functional units) may be external to the memory devices, in which data may be accessed via a bus between the processing resources and the memory devices to execute a set of instructions. This may lead to unnecessarily longer delays and increased power usage in the processing and executing of the instructions. Furthermore, when performing text searches and/or data inquiries of data stored into the memory, these delays and increases in power usage may be exacerbated, particularly when attempting to perform text searches of multiple documents and/or pages of data at once. It may be useful to provide devices and methods to increase processing efficiency and decrease power usage when performing such text or data searches.

BRIEF DESCRIPTION OF DRAWINGS

FIG. 7 includes further illustrations of the process of FIG. 5 implemented on the PIM device of FIG. 3, in accordance with an embodiment.

DETAILED DESCRIPTION

Certain explicitly described embodiments relate to a processor-in-memory (PIM) device and methods useful in providing a high-performance search (e.g., scan) for a data pattern in data stored into rows of the PIM device. Indeed, the PIM device may include, for example, a two-dimensional (2D) array of memory cells, in which the array of memory cells may be arranged with thousands of columns and hundreds of rows, for example. The PIM device may then execute one or more arithmetic functions and/or Boolean logical operations (e.g., AND, OR, NOT, and so forth) to concurrently compare a number of digits of a data pattern (which could be, for example, a pattern, sub-pattern, sequence or sub-sequence) to data stored into a row or rows of the PIM device. For example, the PIM device may replicate the digits of a data pattern to be searched for and store the replicated data pattern into a row of the PIM device. The PIM device may then compare the replicated data pattern to the data stored into a given row of the PIM device to detect a match (e.g., a "hit") of the digits of the data pattern within stored data. By replicating a searched for data pattern across one or more rows of the PIM device, the search performance (e.g., processing speed) of the PIM device may, for example, be significantly improved when searching a data pattern stored, for example, into a given row of the PIM device using "horizontal" data storage orientation (e.g., storing data along rows of the PIM device or wrapped throughout or along the rows).

It should be appreciated that, as used herein, a "row" may refer to an axis of an array of cells (e.g., memory cells). Similarly, "column" may refer to at least one other axis of the array of cells (e.g., memory cells) that may intersect (e.g., extend in a direction perpendicular to) the row axis. For example, the "rows" and the "columns" may be respectively understood to refer to any one of at least two axes, in which the two axes intersect (e.g., are substantially perpendicular). In other words, the "rows" may or may not necessarily be horizontal, and the "columns" may or may not be necessarily vertical, and vice-versa. Furthermore, a "row of accumulators" may refer to a row of memory cells within an array of memory cells that may be designated and/or used to store the results or partial results of one or more performed arithmetic functions and/or logical operations. Similarly, a "row of accumulators" may, in some embodiments, refer to dedicated circuitry that may be included as part of a memory device and may be used to store the results or partial results of one or more performed arithmetic functions and/or logical operations.

Figure 1:
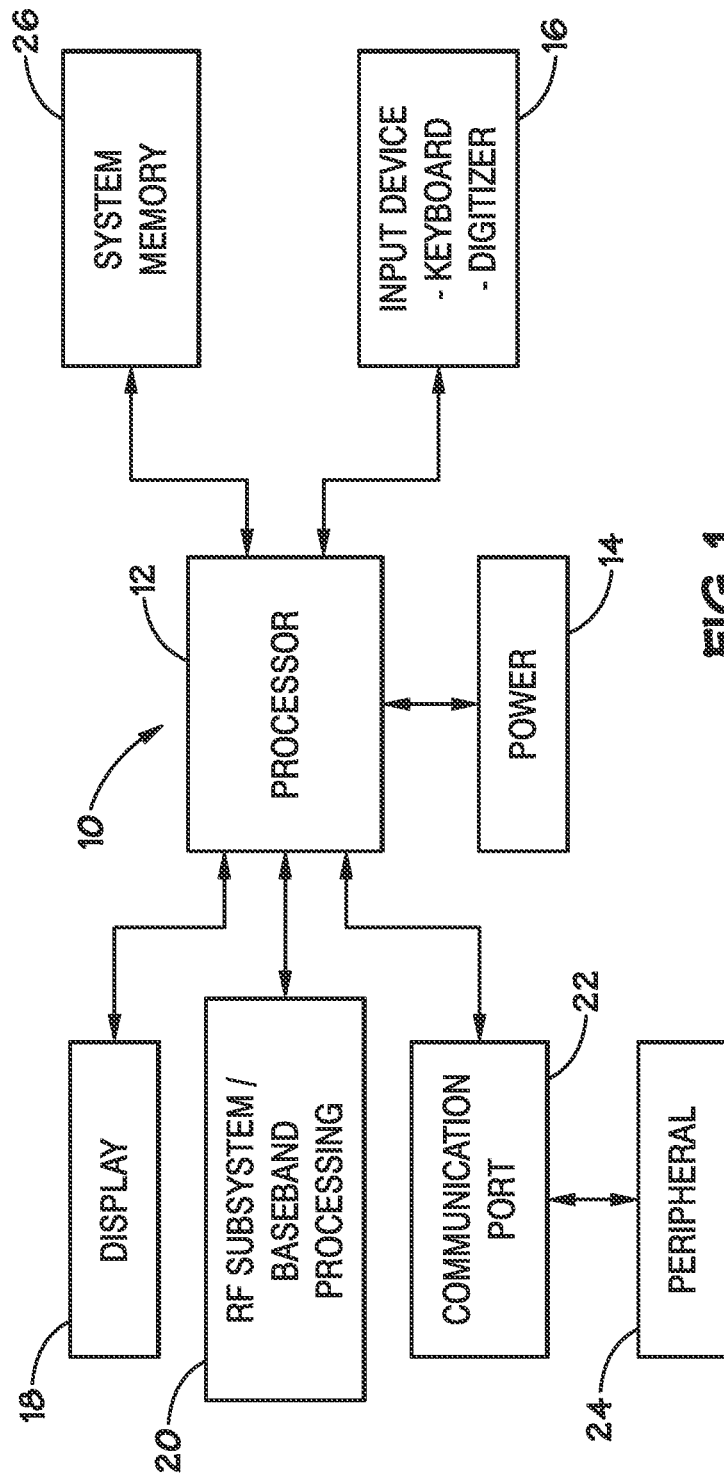
FIG. 1 illustrates a block diagram of a system including a memory device, in accordance with an embodiment.

With the foregoing in mind, it may be useful to describe an embodiment of a processor-based system, such as the processor-based system 10 illustrated in FIG. 1. The processor-based system 10 may include any of various electronic devices such as, for example, computers, tablet computers, pagers, mobile phones, personal organizers, portable audio players, cameras, watches, industrial measurement electronic devices, and so forth. As illustrated, the processor-based system 10 may include a processor 12. The processor 12 (e.g., microprocessor) may be provided to control the processing of system functions and requests in the system 10. Further, the processor 12 may include a number of processors that share system control.

The processor-based system 10 may also include a power supply 14. For example, if the processor-based system 10 may be a portable system, the power supply 14 may include permanent batteries, replaceable batteries, and/or rechargeable batteries. The power supply 14 may also include an alternating current (AC) adapter, such that the processor-based system 10 may receive power from, for example, a wall outlet or other AC power source. The power supply 14 may also include a direct current (DC) adapter such that the processor-based system 10 may receive power from, for example, a DC power source.

Various other devices may be coupled to the processor 12 depending on the functions that the processor-based system 10 performs. For example, in certain embodiments, an input device 16 may be coupled to the processor 12. The input device 16 may include, for example, buttons, switches, a keyboard, a light pen, a stylus, a mouse, and/or a voice recognition system. The system 10 may also include a display 18, which may be coupled to the processor 12. The display 18 may include a liquid crystal display (LCD), a cathode ray tube (CRT), organic light emitting diode displays (OLEDs), and/or various other display technologies.

Furthermore, as further illustrated, the system 10 may include a RF sub-system/baseband processor 20 that may be coupled to the processor 12. In one embodiment, the RF sub-system/baseband processor 20 may include one or more transceivers that may be useful in allowing the system 10 to communicate wirelessly.

A communications port 22 may also be coupled to the processor 12. The communications port 22 may be adapted to be coupled to one or more peripheral devices 24 such as, for example, a modem, a printer, a computer, or to a network, such as a local area network, remote area network, intranet, or the Internet.

In certain embodiments, such as where the processor 12 may be used to control the functioning of the processor-based system 10 by executing instructions, a system memory 26 may be used to allow the processor 12 to efficiently carry out its functionality. As depicted, the system memory 26 may be coupled to the processor 12 to store and facilitate execution of various instructions. The system memory 26 may include volatile memory such as, for example, random access memory (RAM), dynamic random access memory (DRAM), static random access memory (SRAM), synchronous dynamic random access memory (SDRAM), and/or thyristor random access memory (TRAM).

The system memory 26 may also include non-volatile memory such as, for example, read-only memory (ROM), EEPROM, NAND flash memory, NOR flash memory, phase change random access memory (PCRAM), resistive random access memory (RRAM), magnetoresistive random access memory (MRAM), and/or spin torque transfer random access memory (STT RAM). As will be discussed in further detail below, in certain embodiments, the system memory 26 may include one or more processor-in-memory (PIM) devices that may be used to internally process instructions stored (e.g., written) to the system memory 26 (although discussed in the context of this embodiment as being used in the system memory 26, a PIM device can also be used in other memory applications and/or system applications).

For example, as will be further appreciated, processing performance may be improved via the PIM device because a processor and/or processing structure may be provided internal and/or near to a memory (e.g., directly on a same chip as the memory array), such as to increase processing performance and/or conserve power in processing, particularly when searching horizontally stored data (e.g., emails, text, text messages, text documents, text files, script files, text strings, compressed files, webpages, records, and so forth) for a data pattern (e.g., bitstrings or strings of text characters). As will be discussed and illustrated with regard to FIGS. 2 and 3 below, the memory device 30 may be referred to as a PIM device 30, and may include both a memory array 32 (FIG. 3) and a processing structure 52 (FIG. 3).

Figure 2:
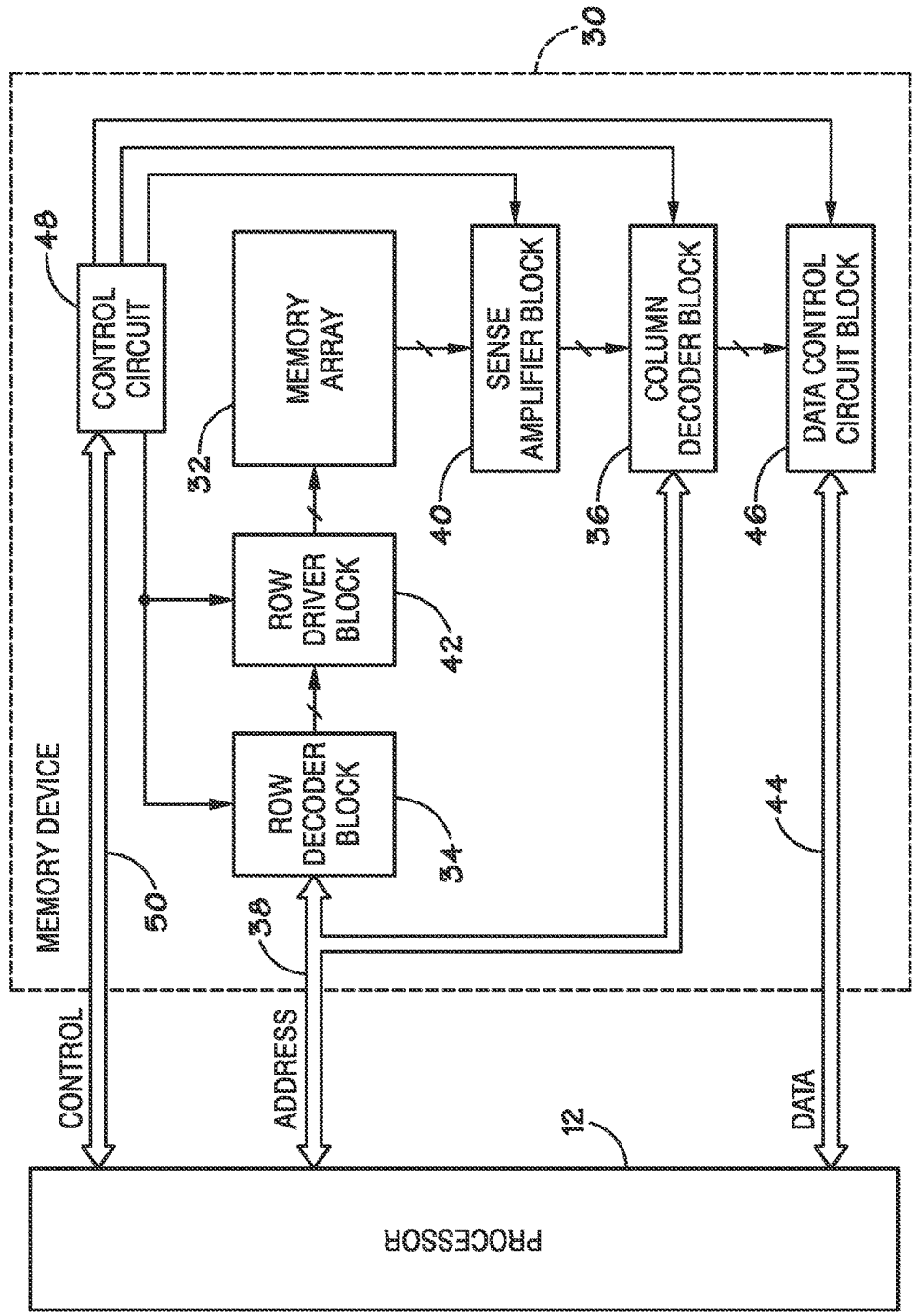
FIG. 2 illustrates a block diagram of the memory device of FIG. 1, in accordance with an embodiment.
Figure 3:
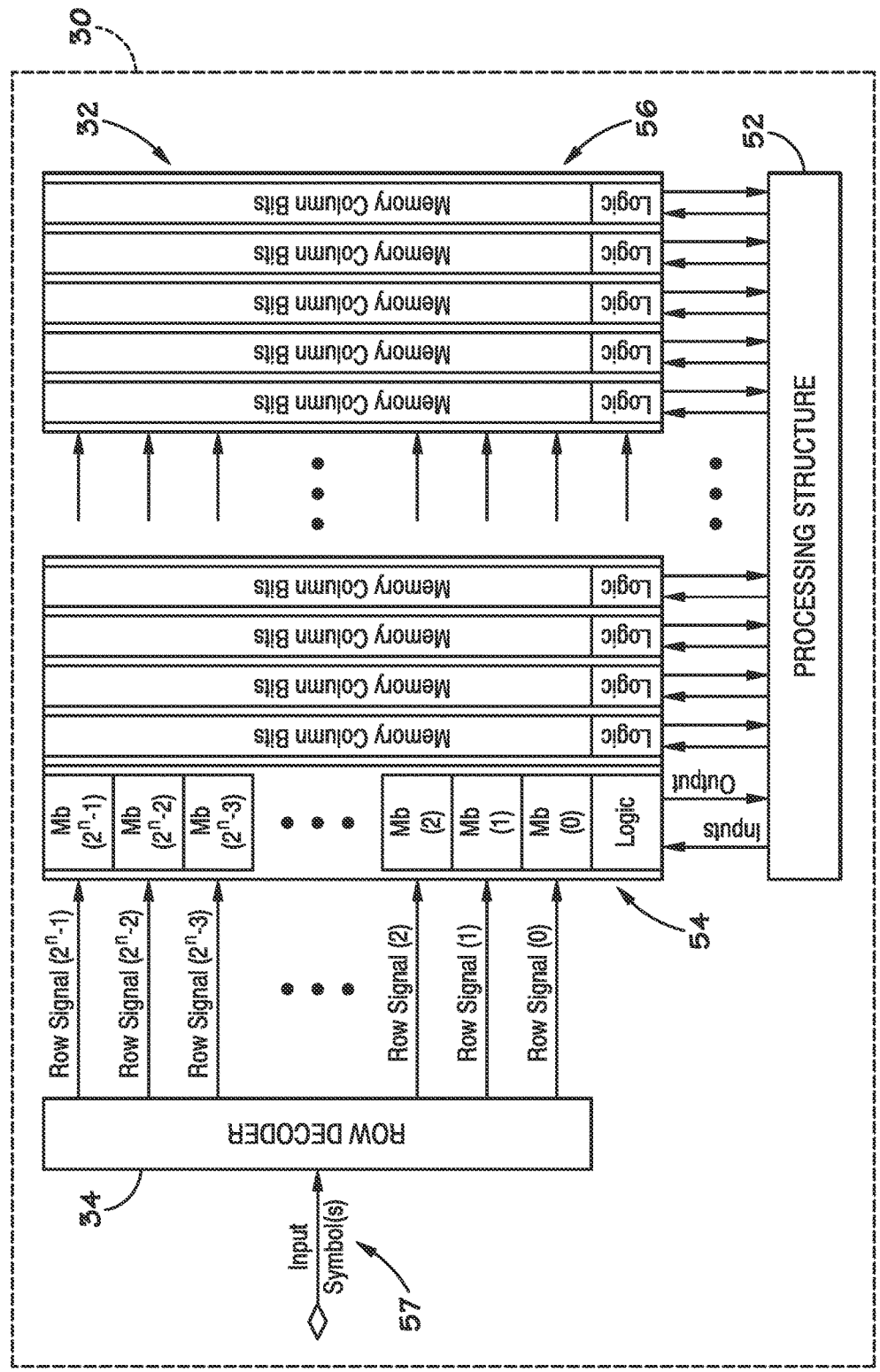
FIG. 3 illustrates a block diagram of a processor-in-memory (PIM) device including a memory array and a processing structure, in accordance with an embodiment.

Turning now to FIG. 2, a block diagram of a memory device 30 that may be included as part of the system memory 26 of FIG. 1 is illustrated. In one embodiment, the memory device 30 may include a DRAM memory device. However, in other embodiments, as previously discussed, the PIM device 30 may include any of various memory devices including, for example, RAM, SRAM, SDRAM, TRAM, NAND flash, NOR flash, PCRAM, RRAM, MRAM, STT RAM, and so forth. As illustrated, the memory device 30 may include a memory array 32. As will be further appreciated, the memory array 32 may include an array of rows (e.g., thousands of rows) and columns (e.g., hundreds of columns) of memory cells that are accessible and sensible by a number of access lines and data lines. The access lines are often referred to as "wordlines" (WL). The data lines are often referred to as "bitlines" (BL) or "digit lines" (DL). The size of the memory array 32 (e.g., the number of memory cells, rows, columns, wordlines and bit/digit lines) may vary between different devices.

As further illustrated, to access the memory array 32, a row decoder block 34 and a column decoder block 36 may be provided to receive and translate address information from the processor 12 via the address bus 38 to access a particular memory cell in the memory array 32. A sensing circuit, such as the sense amplifier block 40 including a number of the sense amplifiers, may be also provided between the column decoder 36 and the memory array 32 to sense individual data values stored into the memory cells of the memory array 32. Further, a row driver block 42 may be provided between the row decoder block 34 and the memory array 32 to activate a selected wordline in the memory array according to a given row address.

In certain embodiments, during read and program operations, such as a write operation, data may be transferred to and from the memory device 30 via the data bus 44. The coordination of the data and address information may be conducted through a data control circuit block 46. As further depicted, the memory device 30 may include control circuitry 48 that may be used to receive control signals from the processor 12 via the control bus 50. The control circuitry 48 may be coupled (e.g., communicatively coupled) to each of the row decoder block 34, the column decoder block 36, the sense amplifier block 40, the row driver block 42, and the data control circuit block 46, and may be used to coordinate timing and control among the various circuits included in the memory device 30.

The control circuitry 48 may decode signals provided by control bus 50 from the processor 12. In certain embodiments, these signals may include chip activate signals, write activate signals, and address latch signals that may be used to control operations performed via the memory array 32 such as, for example, data read, data write, and data erase operations. The control circuitry 48 may be responsible for executing instructions from the processor 12. For example, in one embodiment, the control circuitry 48 may include a state machine, a sequencer, or other similar device.

In certain embodiments, the sense amplifier block 40 may include a number of sense amplifiers (e.g., sense amplifier 64 illustrated in FIG. 4) and a number of processing structures (e.g., component), which may include an accumulator (e.g., processing structure 52 illustrated in FIG. 3) and may be used to perform Boolean logical operations (e.g., on data associated with complementary bitlines). For example, as previously noted, the memory device 30 may include a PIM device 30 used to perform arithmetic functions and/or Boolean logical operations to execute instructions. As illustrated by FIG. 3, the memory array 32 may include processing structure 52 (e.g., that may be included as part of the sense amplifier block 40) that may be communicatively coupled to a two-dimensional array of memory cells by bitlines 56.

In certain embodiments, the processing structure 52 may be used to perform arithmetic functions and/or Boolean logical operations using data stored into the memory array 32 as inputs and may store the results of the functions and operations back to the memory array 32 without transferring via a bitline address access (e.g., without generating a column decode signal). Thus, the processing structure 52 may perform various arithmetic functions and/or Boolean logical operations on the memory device 30 as opposed to relying on (or exclusively on) processing resources external to the memory device 30 (e.g., by the processor 12). For example, the processing structure 52 may include arithmetic logic unit (ALU) circuitry, floating point unit (FPU) circuitry, and/or a combinational logic blocks that may be used to execute instructions by performing arithmetic functions such as, for example, addition, subtraction, multiplication, and division, as well as Boolean logical operations such as, for example, AND, OR, NOT, NAND, NOR, and XOR, sum-of-products (SoP), and products-of-sums (PoS) Boolean logical operations on data (e.g., one or more operands).

In certain embodiments, as further illustrated in FIG. 3, the row decoder 34 may receive one or more input symbols 57 (e.g., 8-bit or 8-byte address signals, 16-bit or 16-byte address signals, 32-bit or 32-byte address signals, 64-bit or 64-byte address signals, and so on). The row decoder 34 may then decode the one or more input symbols 57 (e.g., address signals), and selectively drive respective rows 54 of the memory array 32 to, for example, write or read memory cells of the respective rows. In one embodiment, the data stored into the memory cells of a respective row 54 may include a length of approximately 32 bytes or less, a length of approximately 64 bytes or less, a length of approximately 128 bytes or less, a length of approximately 256 bytes or less, a length of approximately 512 bytes or less, a length of approximately 1,024 bytes or less, a length of approximately 2,048 bytes or less, or a length of approximately 4,096 bytes or less.

In certain embodiments, the processing structure 52 may perform arithmetic functions and/or logical operations on data read from the memory cells of the respective rows 54 of the memory array 32 responsive to driving the respective rows 54. As will be further appreciated, the processing structure 52 of the memory device 30 may be used to provide a high-performance search (e.g., scanning) of the data (e.g., text document, text file, text script) stored into the rows 54, such as by comparing a number of digits in a data pattern (e.g., text or characters of the text document text document, text file, or text script) to a number of digits in the data stored into a row 54 of memory cells of the PIM device.

Figure 4:
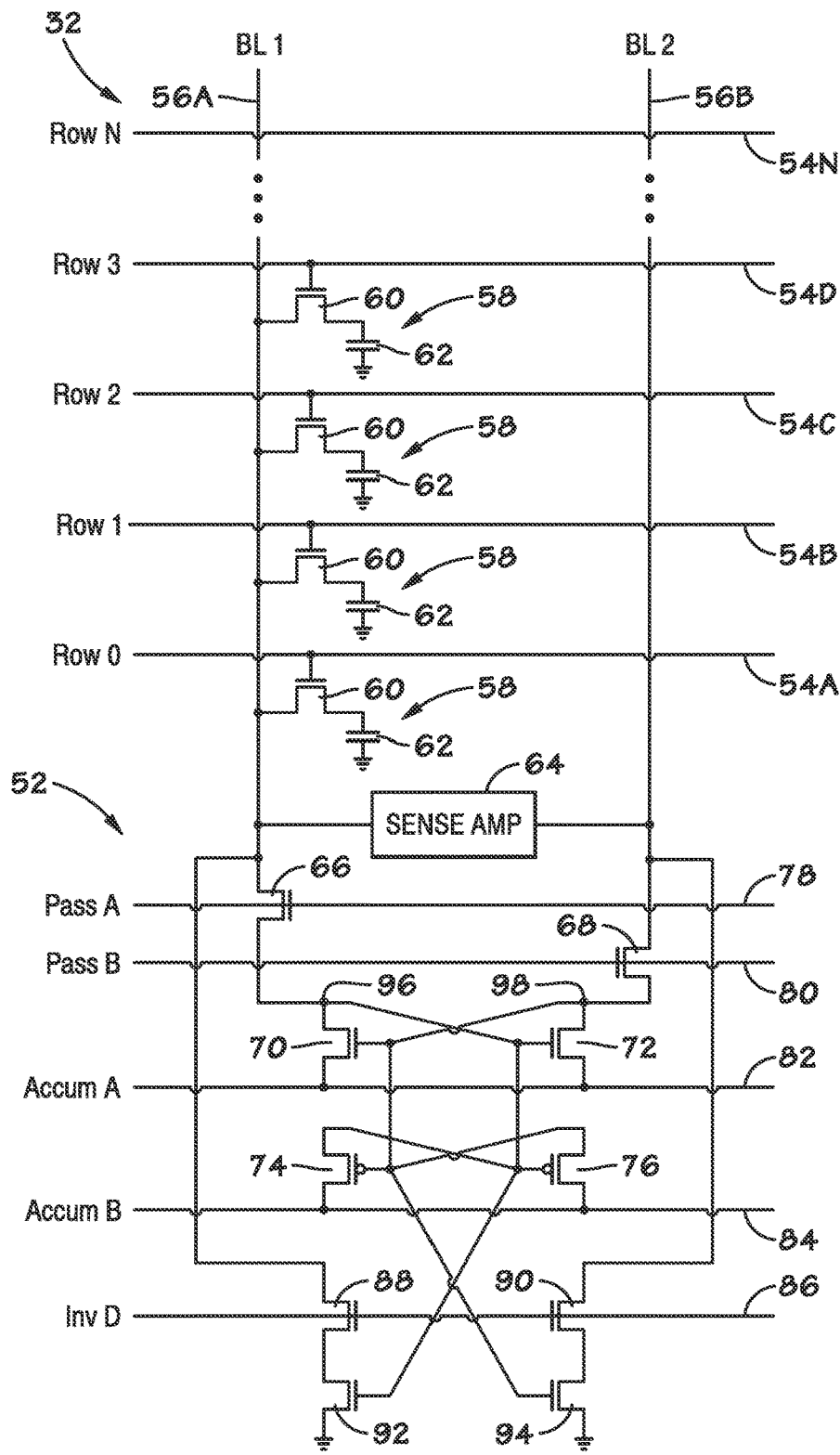
FIG. 4 is component-level circuit diagram of a portion of an array and processing structure of the PIM device of FIG. 3, in accordance with an embodiment.

Turning now to FIG. 4, a component-level illustration (e.g., equivalent circuit) of the memory array 32 and the processing structure 52 of one example of a PIM device 30 is depicted. As previously discussed, in one embodiment, the memory array 32 may include a DRAM memory array, in which each memory cell 58 may include an access device 60 (e.g., transistor) and a storage element 62 (e.g., a capacitor). As further illustrated, and as previously discussed above with respect to FIG. 3, the cells 58 of the memory array 32 may be arranged in rows coupled by wordlines 54A (e.g., "Row0"), 54B (e.g., "Row1"), 54C (e.g., "Row2"), 54D (e.g., "Row3"), up to, for example, 54N (e.g., "RowN"). The memory array 32 may also include columns of memory cells coupled by bitlines 56A (e.g., "BL1") and 56B (e.g., "BL2"). In an embodiment, each column of cells 58 may be associated with a pair of complementary bitlines 56A and 56B.

Although only a single column of memory cells 58 is illustrated in FIG. 4, it should be appreciated that the memory array 32 may include any number of columns (e.g., 1,024, 2,048, 4,096, 8,192, 16,384, or more columns) of memory cells 58 and/or bitlines 56A and 56B. A gate of a particular memory cell transistor 60 may be coupled to a corresponding wordline 54A, 54B, 54C, 54D, and up to 54N, a first source/drain region may be coupled to a corresponding bitline 56A, and a second source/drain region of a particular memory cell transistor may be coupled to a corresponding capacitor 62. Furthermore, although not illustrated in FIG. 4, the bitline 56B may be also coupled to a separate column of memory cells 58.

In certain embodiments, as previously discussed, the memory array 32 may be coupled to the sense amplifier block 40. The sense amplifier block 40 may include a sense amplifier 64 and a processing structure 52. The sense amplifier 64 may be coupled to the complementary bitlines 56A and 56B corresponding to a particular column of memory cells 58. The sense amplifier 64 may be used to determine a state (e.g., logic data value) stored into a selected cell 58. For example, in one embodiment, the sense amplifier 64 may include one or more current-mode sense amplifiers and/or single-ended sense amplifiers (e.g., sense amplifier 64 coupled to one bitline).

In certain embodiments, as further illustrated in FIG. 4, the processing structure 52 (e.g., PIM device) may include a number of transistors formed on pitch with the transistors of the sense amplifier 64 and/or the memory cells 58 of the memory array 32. The pitch may conform to a particular feature size such as, for example, $4F^2$, $6F^2$, and so forth. In some embodiments, the processing structure 52 may operate (e.g., alone or in conjunction with the sense amplifier 64) to perform various arithmetic functions (e.g., addition, subtraction, multiplication, division, and so forth) and/or Boolean logical operations (e.g., AND, OR, NOT, NAND, NOR, and XOR, sum-of-products (SoP), products-of-sums (PoS)) using data from the memory array 32 as input and store the result back to the memory array 32 without necessarily transferring the data via a bitline address access to, for example, the external processor 12.

Figure 5:
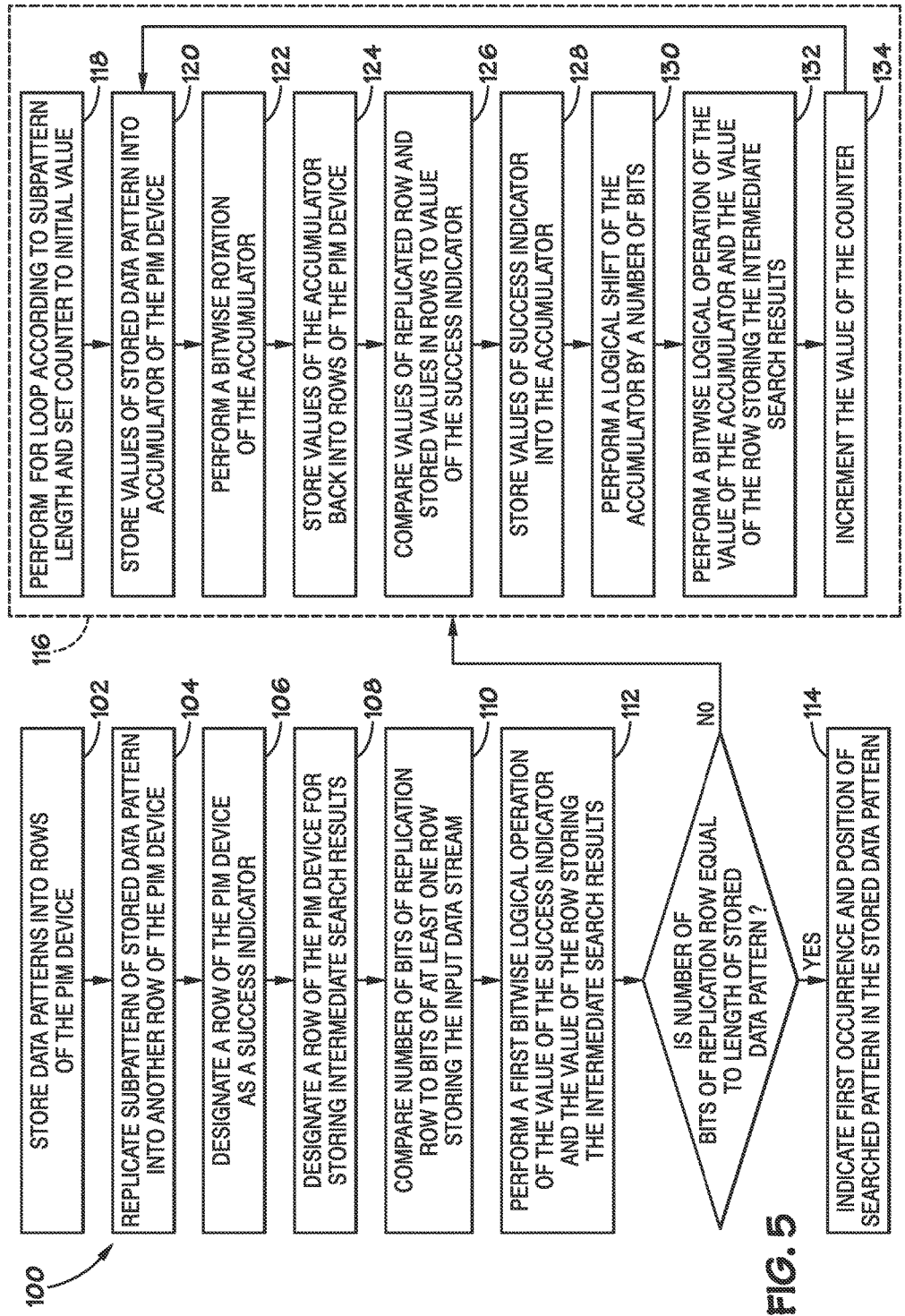
FIG. 5 is a flowchart illustrating an embodiment of a process useful in searching data using a replicated data pattern, in accordance with an embodiment.
Figure 6:
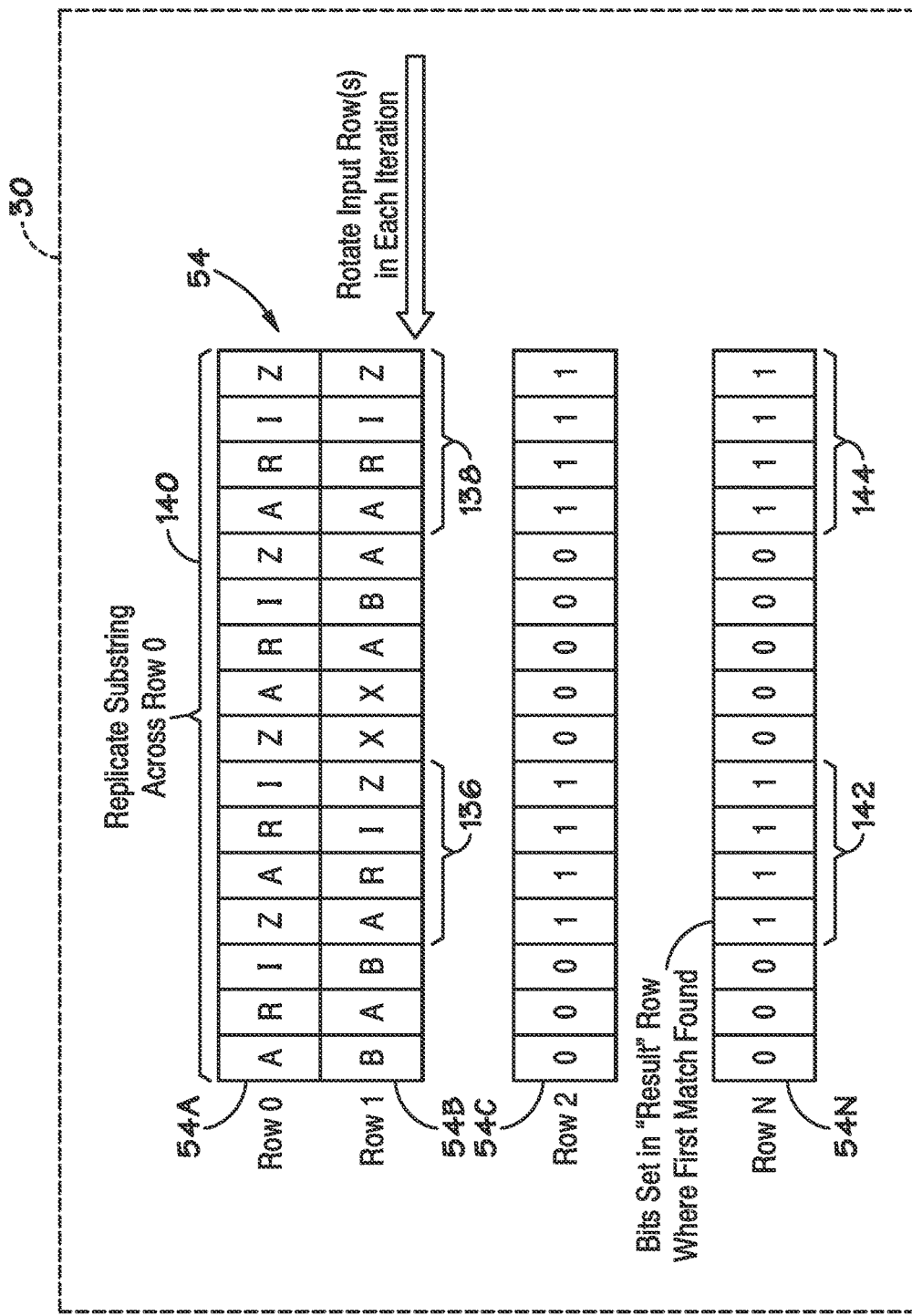
FIG. 6 is an illustration of the process of FIG. 5 implemented on the PIM device of FIG. 3, in accordance with an embodiment.

For example, as will be further appreciated with respect to FIGS. 5 and 6, the processing structure 52 of the PIM device 30 may be used to provide a high-performance search (e.g., scanning) of rows 54 of data stored horizontally into rows 54 of the memory array 32. For example, as will be further appreciated, the processing structure 52 of the PIM device 30 may be used to speedily and efficiently perform a text search of a number of emails, text, text messages, text documents, text files, script files, text strings, compressed files, webpages, records, and so forth when such data is stored according to a horizontal data storage orientation (e.g., stored along the rows 54 or wrapped through and/or along the rows 54).

In certain embodiments, as further illustrated in FIG. 4, the processing structure 52 may include a number of transistors 66 and 68 coupled to each of the bitlines 56A and 56B. The transistors 66 and 68 may include a first terminal (e.g., source and/or drain) that may be coupled to the bitlines 56A and 56B, respectively, and a second terminal (e.g., source and/or drain) coupled to accumulator circuitry (e.g., cross-coupled transistors 70, 72, 74, and 76). In some embodiments, the transistors 66 and 68 may be pass transistors, which may be activated via respective signals 78 (e.g., PASS A) and 80 (e.g., PASS B) in order to pass the voltages and/or currents on the respective bitlines 56A and 56B to the inputs of the accumulator circuitry. As depicted, the accumulator circuitry may include a cross coupled latch including, for example, cross coupled NMOS transistors 70 and 72 and cross coupled PMOS transistors 74 and 76. For example, the accumulator circuitry may be provided to perform one or more accumulate operations on data values of, for example, the bitlines 56A and 56B.

In certain embodiments, a source/drain region of transistor 70 and 72 may be commonly coupled to a negative signal 82 (e.g., ACCUM A). Similarly, a source/drain region of transistors 74 and 76 may be commonly coupled to a positive signal 84 (ACCUM B). The signal 84 (e.g., ACCUM B) may include a supply voltage (e.g., $V_{CC}$), while the signal 82 may include a reference voltage (e.g., a low voltage or ground). For example, the signals 82 and 84 may be provided to activate the accumulator circuitry. The activated accumulator circuitry may operate to amplify a differential voltage between common node 96 and common node 98, such that nodes 96 and 98 may be respectively driven to one of the signals 82 (e.g., ACCUM A) and 84 (e.g., ACCUM B). The processing structure 52 may also include inverting transistors 88 and 90 having a first source/drain region coupled to the respective bitlines 56A and 56B, and a second source/drain region coupled to a first source/drain region of transistors 92 and 94 to perform, for example, NOT Boolean logical operations. As further depicted, the gates transistors 88 and 90 may be coupled to a signal 86 (e.g., "InvD") that may be provided to invert one or more data values along the bitlines 56A and 56B.

In certain embodiments, it may be useful to utilize the processing structure 52 of the PIM device 30 to search horizontally stored data for a given data pattern. For example, as will be further appreciated, the processing structure 52 of the PIM device 30 of the memory array 32 may be used to compare a number of digits of a replicated data pattern to a number of digits of one or more input data patterns stored separately into the rows 54 of the PIM device 30. By replicating a searched for data pattern into one or more rows of the PIM device 30, the search performance (e.g., processing speed) of the PIM device 30 may, for example, be significantly improved when searching a data pattern stored, for example, into a given row 54 of memory cells of the PIM device 30 using an aforementioned horizontal data storage orientation (e.g., storing data along the rows 54 of memory cells or wrapped throughout or along the rows 54 of memory cells).

Turning now to FIG. 5, a flow diagram (e.g., design flow) is presented, illustrating an embodiment of a process 100 (and sub-process 116) useful in searching a data pattern (e.g., a long string of ASCII characters) stored horizontally into a given row for one or more data patterns by using, for example, the processor-in-memory (PIM) device 30 (e.g., memory array 32 and processing structure 52) included within the system 10 and depicted, for example, in FIGS. 3 and 4. The process 100 may include instructions (e.g., code) stored into a non-transitory machine-readable medium (e.g., the PIM device 30 and/or the memory array 32 of the PIM device 30) and executed, for example, by the control circuitry 48 (which, in turn, may cause the processing structure 52 of the PIM device 30 to perform certain arithmetic functions and/or Boolean logical operations). For the purpose of illustration, henceforth, FIG. 5 may be discussed in conjunction with FIGS. 6 and 7. Furthermore, while the discussion of FIGS. 5, 6, and 7 may be directed toward the behavioral synthesis (e.g., register transfer level (RTL) configuration) of the PIM device 30 to search a data pattern stored horizontally into a given row of memory cells for a data pattern, for example, it should be appreciated that the physical synthesis (e.g., physical layout generation and construction) of the PIM device 30 may, in one or more embodiments, correspond to the component-level equivalent circuit of the memory array 32 and the processing structure 52 depicted in FIG. 4.

With the foregoing in mind, the process 100 may begin with the PIM device 30 storing (block 102) one or more data input sequences or streams into one or more rows of the PIM device. For example, as illustrated in FIGS. 6 and 7, a data stream (e.g., "BABARIZXXABAARIZ") may be stored horizontally into a first row 54B (e.g., "Row 1") of memory cells of the PIM device 30. As used herein, terms such as "first", "second", "third", etc., are used only for purposes of clearly distinguishing between different referenced elements, and are not necessarily used to refer to any actual or relative position or location of such elements. The process 100 may also include the PIM device 30 replicating (block 104) a data pattern to be searched for (e.g., "ARIZ") and storing the replicated data pattern 140 (e.g., "ARIZARIZARIZARIZ") into a second row 54A (e.g., "Row 0") of memory cells of the PIM device 30. In some embodiments, the replicated data pattern 140 (e.g., "ARIZARIZARIZARIZ") stored into the second row 54A (e.g., "Row 0") of memory cells may include the same number of digits (e.g., 4, 8, 16, or more characters and/or 32, 64, 128, or more bits per datum) as the data stream (e.g., "BABARIZXXABAARIZ") stored horizontally into the first row 54B (e.g., "Row 1") of memory cells.

The process 100 may also include the PIM device 30 designating (block 106) a third row of memory cells of the PIM device as a search results row. For example, as illustrated in FIGS. 6 and 7, a third row 54N (e.g., "Row N") of memory cells of the PIM device 30 may be used to indicate when and/or where a searched for data pattern (e.g., one or more characters of an email, a text, a text message, a text document, a text file, a script file, a text string, a compressed file, a webpage, and so forth) has been detected within data stored into, for example, the first row 54B (e.g., "Row 1") of memory cells. In one embodiment, the memory cells of the row 54N designated for storing search results may each be initialized to a logical value of "0." The process 100 may also include the PIM device 30 designating (block 108) a fourth row of memory cells of the PIM device 30 as a scratch row, such as for storing intermediate comparison results. For example, a row 54C (e.g., "Row 2") of memory cells of the PIM device 30 may be designated for storing intermediate comparison results as the PIM device 30 performs one or more arithmetic functions and/or Boolean logical operations to detect the first occurrence (e.g., the first occurrence and the position) of the searched for data pattern.

The process 100 may include the PIM device 30 comparing (block 110) the replicated data pattern 140 stored into the row 54A of memory cells to a data input stream stored into at least one other row 54B of the memory array. For example, as illustrated in FIGS. 6 and 7, the PIM device 30 may compare a row 54A (e.g., "Row 0") of memory cells storing the replicated data pattern 140 (e.g., "ARIZARIZARIZARIZ") with a row 54B (e.g., "Row 1") of memory cells storing a data input stream (e.g., "BABARIZXXABAARIZ"). In one or more embodiments, the comparison may be performed such that the results of the comparison may have some number k of bits (e.g., 32 for the number of bits in the ASCII character subpattern 'ARIZ') all set to '1' if the corresponding bits in the row 54A and the row 54B are identical. On the other hand, those same number k bits may be all set to '0' if any of the corresponding bits in the row 54A and the 54B are different. As an example, the comparison described by block 110 (and block 126 of sub-process 116) may be executed as:

```
accumulator = rowPattern
accumulator = accumulator BITWISE_XOR rowInput;
rowtempx = accumulator;
accumulator = ZERO(accumulator);
Comment: Set bit to 1 in columns that are integer
multiples of element_size
Comment: That is, leftmost bit of each element is set
accumulator = STRIDE_SET_COLUMN( accumulator,
element_size );
rowtempm = accumulator;
Comment: Copy leftmost bit of x into accumulator
accumulator = BITWISE_AND(rowtempx, accumulator);
rowtempt = accumulator;
Comment: Create row - rowtempt - which has all bits set
in elements where
Comment: rowtempx has any bit in that element set.
Conversely, elements of Comment: rowtempt are zero if
all bits of corresponding element of rowtempx
Comment: are zero.
for ( int i = 1; i < element_size; 1++ ) {
   accumulator = rowtempm;
   accumulator = accumulator >> 1;
   rowtempm = accumulator;
   Comment: Copy only the next bit of each element to
   accumulator;
   accumulator = BITWISE_AND( accumulator, rowtempx );
   accumulator << i;
   Comment: OR the "next bit" with leftmost bit
   rowtempt = rowtempt | accumulator;
}
Comment: Now invert result for true = all bits set in
element and false = all bits zero.
accumulator = rowtempt;
result = BITWISE_INVERT( accumulator );
```

In certain embodiments, the results of the comparison of row 54B (e.g., "Row 1") of memory cells and the row 54A (e.g., "Row 0") of memory cells may be stored into the scratch row 54N (e.g., "Row N") of memory cells to indicate whether a successful match (e.g., a "hit") of the searched for data pattern has been detected in the row 54B of memory cells. Referring again to FIGS. 6 and 7, the binary value stored by corresponding memory cells of the scratch row 54N (e.g., "Row N") may be changed (e.g., all bits changed from "0" to "1" in all cells corresponding to 'ARIZ' such that the value of those 32 bits is 0xFFFFFFFF) when the PIM device 30 detects a successful match (e.g., a "hit") of the data pattern to be searched for (e.g., "ARIZ") within the data stored into row 54B (e.g., "Row 1") of memory cells.

For example, in an embodiment where eight (8) adjacent memory cells in row 54B store eight (8) bits representing an ASCII character (e.g., "A") and eight (8) corresponding memory cells in row 54A also store eight (8) bits representing the same ASCII character, all eight (8) corresponding memory cells into row 54N may be "set" to indicate a character match. If each unit of data of the entire searched for data pattern does not match each unit of data in a corresponding substring of data in the data pattern stored into row 54B of memory cells, then a "0" is stored into each of the memory cells of the row 54N (e.g., "Row N") corresponding to that particular substring.

The process 100 may also include the PIM device 30 performing (block 112) a first bitwise logical operation of the data stored into the scratch row of memory cells and the data stored into the search results row of memory cells. For example, the PIM device 30 may perform a bitwise OR logical operation of the data stored into the search results row 54N of memory cells (which was originally initialized to a value of 0) and the data stored into the scratch row 54C (e.g., the results of the first comparison operation), and store the result of the bitwise OR logical operation into the search results row 54N (e.g., overwriting the initialized value of the data).

The process 100 may include the PIM device 30 determining (decision 114) whether the number of units of data (e.g., one or more 8-bit characters of data) in the searched for data pattern (e.g., "ARIZ") is greater than 1. If the number of units of data in the searched for data pattern is 1, the process 100 may then conclude with the PIM device 30 indicating (block 110) an occurrence and/or position of the searched for data pattern in the stored data input data stream. For example, the data stored into the search results row 54N ("Row N) would indicate whether and where the searched for data pattern was detected in the data input stream stored into row 54B (e.g., by setting corresponding memory cells in the row 54N to a logical value of "1").

If the number of units of data in the searched for data pattern is greater than 1 (e.g., as would be the case in the data pattern "ARIZ", where there are four units, i.e., 8-bit characters, of data in the data pattern), the PIM device 30 may perform a sub-process 116 as further depicted in FIG. 5. The sub-process 116 may be performed by executing instructions (e.g., code) stored into a non-transitory machine-readable medium (e.g., the PIM device 30 and/or the memory array 32 of the PIM device 30), for example, by the control circuitry 48, which in turn may cause the processing structure 52 of the PIM device 30 to perform certain arithmetic functions and/or Boolean operations. The sub-process 116 may begin with the PIM device 30 performing (block 118) a for-loop, from 1 to B, where B is the number of units of data in the searched for data pattern. For example, a counter, K, associated with the for-loop may be initialized to 1.

The sub-process 116 may then continue with the PIM device 30 storing (block 120) the data input stream being searched (e.g., the data stored into row 54B) into a row of accumulators of the PIM device 30. For example, referring again to FIGS. 6 and 7, the values corresponding to the stored data input stream (e.g., "BABARIZXXABAARIZ") of the row 54B of memory cells may be stored into a row of accumulators (e.g., a row of accumulator circuitry) of the PIM device 30. The sub-process 116 may then continue with the PIM device 30 performing (block 122) a rotation (e.g., bitwise rotation) of the data stored into the row of accumulators.

For example, the PIM device 30 may perform a rotation of the data of the accumulator row such that, for example, the 2nd unit of data (e.g., the eight bits of data representing a $2^{nd}$ ASCII character in the data pattern) stored into the row of accumulators is placed in the position at which the 1st unit of data was previously placed in the row of accumulators, and the $1^{st}$ unit of data is placed in the position at which the Bth unit of data was previously placed in the row of accumulators. As further examples, FIG. 7 illustrates iterations of the presently disclosed embodiments for, for example, K=0, K=1, K=2, and K=3. For example, FIG. 7 includes illustrations of the memory cell rows 54A, 54B, 54C, and 54N as the process 100 and/or sub-process 116 are performed for, for example, K=0, K=1, K=2, and K=3.

The sub-process 116 may then include storing (block 124) the rotated data into row 54B. The sub-process 116 may then continue with the PIM device 30 comparing (block 126) the replicated data pattern 140 stored into row 54A and the rotated data stored into row 54B, and storing a result of the comparison in the search results row 54N of memory cells. For example, as previously noted above, the PIM device 30 may compare a k number of digits (e.g., 8, 16, 32 or more bits) of the replicated data pattern 140 (e.g., "ARIZARIZA-RIZARIZ") stored into row 54A (e.g., "Row 0") and a k number of digits (e.g., 8, 16, 32 or more bits) of the rotated data now stored into row 54B (e.g., "Row 1") (e.g., "ABA-RIZXXABAARIZB"), with the result of the comparison being stored into search results row 54N (e.g., "Row N") to determine if a successful match (e.g., a "hit") of the searched for data pattern has been detected in the rotated data pattern stored into row 54B of memory cells. The sub-process 116 may also include the PIM device 30 storing (block 128) the result of the comparison ("intermediate comparison results data") into the row of accumulators.

The sub-process 116 may also include the PIM device 30 performing (block 130) a logical shift of the intermediate comparison results data stored into the row of accumulators. For example, in one embodiment, the results data stored into the row of accumulators may be logically shifted to the right by, for example, C*U bits (where C in this case is the current value of the counter K and U is the number of bits in a unit of data). The logical shift may, for example, adjust the intermediate comparison results data stored into the row of accumulators to align the bits of the intermediate comparison results data with the bits of the data pattern as they were originally stored into row 54B. The sub-process 116 may include the PIM device 30 performing (block 132) a bitwise logical operation of the shifted intermediate comparison results data stored into the row of accumulators and the data stored into the search results row 54C. For example, the PIM device 30 may perform a bitwise OR operation of the shifted intermediate comparison results data stored into the row of accumulators and the interim search results data stored into row 54C, as generally illustrated in FIG. 7 for, for example, K=0, K=1, K=2, and K=3.

If the value of the counter K is equal to B, the sub-process may conclude. Otherwise, the sub-process 116 may include changing (e.g., incrementing) (block 134) the value of the counter K and repeating the sub-process 116 (e.g., by storing the data currently stored into the row 54B in the row of accumulators, as describe with respect to block 120 and proceeding with the remaining acts of the sub-process 116). After concluding the process 100, the result data stored into the row 54N indicates the position of the first match (e.g., a first "hit") of the data pattern in the data originally stored into the row 54B.

For example, the first set bit in the data stored into the row 54N indicates the position of the first match of the data pattern in the data originally stored into the row 54B. This result may be adjusted to accommodate the units in the data type (e.g., by dividing the column number of the first set memory cell in row 54N by U). Although not illustrated as part of the sub-process 116, it should also be appreciated that, in some embodiments, the rotation of the bits stored in any row being analyzed may be reverted, such that the data stored in the row 54B may be returned to its original positioning. As a further example of the presently described process 100 and/or the sub-process 116, in one or more embodiments, the process 100 and/or the sub-process 116 may be executed as:

```
    Replicate substring across r0
    Load input into r1
    int k = 0;
    int b = strlen(substr)  * 8;   // b = #bits in
substr
    if (b == 0) return (input);
    Initialize victory row, r13 = 0
    Element-wise compare r0 with r1, store result in
r13
        Comment: All bits set where elements are
equal.
    r13 = BITWISE_OR(r12, r13)
NEXT_SUBSTR_CHAR
    k++;
    if ( k >= b ) go to COMPARES_DONE
    ACC = r1
    ACC = ACC << 8
    R1 = ACC # Move to next digit in input
    Element-wise compare r0 with r1, store result in
r13
        Comment: All bits set where elements are
equal.
    ACC = r13
    ACC = ACC >> 8
                        # Adjust match for char
position
    r13 = BITWISE_OR(ACC, r13)
                        # Update result in r13
    go to NEXT_SUBSTR_CHAR
COMPARES_DONE
    k = column #of leading 1 in r13;
    k = k/8;
    return (input + k);
```

By utilizing the PIM device 30 to replicate a searched for data pattern into one or more rows of memory cells of the PIM device 30, the search performance (e.g., processing speed) of the PIM device 30 may, for example, be significantly improved when searching a data pattern stored, for example, into a given row of memory cells of the PIM device using a horizontal data storage orientation.

While the invention may be susceptible to various modifications and alternative forms, specific embodiments have been illustrated by way of example in the drawings and have been described in detail herein. However, it should be understood that the invention may be not intended to be limited to the particular forms disclosed. Rather, the invention may be to cover all modifications, equivalents, and alternatives falling within the spirit and scope of the invention as defined by the following appended claims.

What is claimed is:

1. A method, comprising:
   replicating a data pattern to be searched for across a first row of memory cells;

comparing the first row of memory cells including the replicated data pattern to data stored into a second row of memory cells; and responsive to detecting the data pattern in the data stored into the second row of memory cells, storing into a third row a value indicative of at least one of an occurrence of the data pattern or a position of the searched for data pattern in the data stored into the second row of memory cells.

2. The method of claim 1, comprising storing a data pattern into the second row of memory cells as the data stored into the second row of memory cells.

3. The method of claim 1, wherein detecting the data pattern in the data stored into the second row comprises comparing a number of digits of the searched for data pattern to a number of digits of the data stored into the second row of memory cells.

4. The method of claim 3, wherein, when a number of digits of the data pattern is not equal to a length value of 1:
performing a for-loop according to a length value of the data pattern;
storing values of the data stored into the row of memory cells into a row of accumulators; and
performing a logical rotation of the values stored into the row of accumulators to compare the data pattern to the data stored into the row of memory cells.

5. The method of claim 4, comprising performing a logical shift operation of the row of accumulators by a number of digits to align digits indicating a match between the data pattern and the data stored into the row of memory cells.

6. The method of claim 5, comprising performing a logical operation based at least in part on a result of the logical shift operation, wherein performing the logical operation comprises storing the value indicative of a first occurrence of the data pattern in the data stored into the row of memory cells.

7. A processor-in-memory (PIM) device, comprising:
a plurality of memory cells; and
a processing structure communicatively coupled to the plurality of memory cells, wherein the PIM device is configured to:
replicate a data pattern to be searched for into a first row of the plurality of memory cells;
compare the first row of the plurality of memory cells that includes the replicated data pattern to data stored into a second row of the plurality of memory cells; and
responsive to detecting the data pattern in the data stored into the second row of the plurality of memory cells, store into a third row of the plurality of memory cells a value indicative of at least one of an occurrence of the data pattern or a position of the data pattern in the data stored into the second row of the plurality memory cells.

8. The PIM device of claim 7, wherein the data stored into the row of the plurality of rows of memory cells comprise at least a portion of an email, a text message, a text document, a text file, a text string, a script file, a compressed file, a webpage, or any combination thereof.

9. The PIM device of claim 7, wherein the PIM device being configured to compare the replicated data pattern to the data stored into the second row comprises the PIM device being configured to compare a number of digits of the replicated data pattern to a number of digits of the data stored into the second row of the plurality of memory cells.

10. The PIM device of claim 7, wherein the PIM device is configured to compare a number of digits of the searched for data pattern to a length value of 1 before storing the value indicative of the at least one of the occurrence or the position of the searched for data pattern in the data stored into the second row of the plurality memory cells.

11. The PIM device of claim 10, wherein the length of the data stored into the second row of the plurality of rows of memory cells comprises a length of approximately 2 kilobytes (kB) or less.

12. The PIM device of claim 10, wherein the length of the data stored into the second row of the plurality of rows of memory cells comprises a length of approximately 2 kilobytes (kB) or more.

13. The PIM device of claim 7, wherein the PIM device is configured to compare the replicated data pattern to data stored into the second row of the plurality of memory cells a number of times equal to a length of the data pattern.

14. A non-transitory computer-readable medium having computer executable code stored thereon, the code comprising instructions to:
store a data pattern into a first row of a plurality of memory cells of the PIM device;
replicate a data pattern to be searched for across the first row of the plurality of memory cells;
storing the replicated data pattern into a second row of the plurality of memory cells;
execute, via the PIM device, a comparison of replicated data pattern stored into the second row of memory cells and the data pattern stored into the first row of memory cells; and
responsive to detecting the data pattern in the data pattern stored into the first row of memory cells, store into a third row of memory cells a value indicative of at least one of an occurrence of the data pattern or a position of the data pattern in the data pattern stored into the first row of memory cells.

15. The non-transitory computer-readable medium of claim 14, comprising instructions to:
execute a comparison of digits of the data pattern to digits of the data pattern stored into the first row of memory cells; and
store into the third row of memory cells the value indicative of the at least one of the occurrence or the position of the replicated data pattern when the digits of the replicated data pattern is detected in the digits of the data pattern stored into the first row of memory cells.

16. The non-transitory computer-readable medium of claim 14, comprising:
executing a comparison of a number of digits of the replicated data pattern to a length value of 1; and
storing into the third row of memory cells the value indicative of the at least one of the occurrence or the position of the replicated data pattern when the number of digits of the replicated data pattern is equal a length value of 1.

17. The non-transitory computer-readable medium of claim 16, wherein, when the number of digits of the replicated data pattern is not equal to the length value of 1, the code comprises instructions to:
perform a for-loop according to a length of the replicated data pattern;
store values of the data pattern into a row of accumulators; and
perform a bitwise logical rotation of the values stored into the row of accumulators to iteratively compare the replicated data pattern stored into the second row of memory cells and the data pattern stored into the first row of memory cells.

18. The non-transitory computer-readable medium of claim 17, comprising instructions to perform a logical shift operation of the row of accumulators by a number of digits to align digits indicating a match between the replicated data pattern stored into the second row of memory cells and the data pattern stored into the first row of memory cells.

19. The non-transitory computer-readable medium of claim 18, comprising instructions to perform a bitwise logical operation based at least in part on a result of the logical shift operation, wherein performing the bitwise logical operation comprises storing the value indicative of a first occurrence of the replicated data pattern in the first row of memory cells.

20. The non-transitory computer-readable medium of claim 14, comprising instructions to store into the third row of memory cells a value indicative of the first occurrence of the data pattern and the position of the data pattern in response to detecting the data pattern in the data pattern stored into the first row of memory cells.

\* \* \* \* \*